United States Patent [19]

Grosswiller et al.

[11] Patent Number: 5,735,644
[45] Date of Patent: Apr. 7, 1998

[54] PNEUMATIC TUBE SYSTEM AND BLOWER ASSEMBLY

[75] Inventors: Leo J. Grosswiller, East Canton; Mark A. DePietro, Canton; Morton B. Albert, Akron; Kenneth L. Wilhelm, Massillon; Robert J. Beck, North Canton, all of Ohio

[73] Assignee: Diebold, Incorporated, Canton, Ohio

[21] Appl. No.: 621,569

[22] Filed: Mar. 25, 1996

[51] Int. Cl.$^6$ ............................................ B65G 51/26
[52] U.S. Cl. .......................... 406/112; 406/31; 417/315
[58] Field of Search ............................ 406/10, 11, 12, 406/13, 19, 21, 22, 26, 27, 28, 29, 31, 84, 110, 111, 112, 147, 148, 149, 176, 179, 180; 417/315

[56] References Cited

U.S. PATENT DOCUMENTS

| | | | |
|---|---|---|---|
| D. 341,014 | 11/1993 | Grosswiller et al. | D99/28 |
| D. 361,194 | 8/1995 | Grosswiller et al. | D99/35 |
| 620,649 | 3/1899 | Hamilton et al. | 406/110 |
| 714,865 | 12/1902 | Collis et al. | 406/7 |
| 947,176 | 1/1910 | Gissot | 406/112 |
| 2,763,446 | 9/1956 | Hanson | 406/13 |
| 3,232,559 | 2/1966 | Grosswiller, Jr. et al. | 406/198 |
| 3,237,882 | 3/1966 | Grosswiller, Jr. et al. | 406/110 |
| 3,237,884 | 3/1966 | Grosswiller, Jr. et al. | 406/186 |
| 3,482,801 | 12/1969 | Leontas | 406/188 |
| 3,506,216 | 4/1970 | Delamater | 406/188 |
| 3,556,436 | 1/1971 | Roelandt | 406/188 |
| 3,556,437 | 1/1971 | Swedman et al. | 406/28 |
| 3,618,874 | 11/1971 | Kettering et al. | 406/34 |
| 3,655,153 | 4/1972 | Terrell | 406/189 |
| 3,689,009 | 9/1972 | Terrell | 406/190 |
| 3,690,593 | 9/1972 | Kettering | 406/186 |
| 3,701,497 | 10/1972 | Anders et al. | 406/188 |
| 3,756,537 | 9/1973 | Freese | 406/188 |
| 3,787,008 | 1/1974 | Barnett et al. | 406/190 |
| 3,788,577 | 1/1974 | Barnett et al. | 406/188 |
| 3,867,593 | 2/1975 | Kryah et al. | 406/34 |
| 3,976,264 | 8/1976 | Ekama et al. | 406/112 |
| 4,059,246 | 11/1977 | Anders et al. | 406/31 |
| 4,135,684 | 1/1979 | Willey | 406/13 |
| 4,189,261 | 2/1980 | Kelley et al. | 406/112 |
| 4,251,169 | 2/1981 | Kelley et al. | 406/110 |
| 4,315,704 | 2/1982 | Kelley et al. | 406/12 |
| 4,343,574 | 8/1982 | Anders | 406/13 |
| 4,352,603 | 10/1982 | Anders | 406/27 |
| 4,710,098 | 12/1987 | Anders et al. | 415/149.1 |
| 5,131,792 | 7/1992 | Grosswiller et al. | 406/112 |
| 5,147,154 | 9/1992 | Scott | 406/112 |
| 5,181,805 | 1/1993 | Grosswiller et al. | 406/189 |
| 5,181,806 | 1/1993 | Grosswiller et al. | 406/189 |
| 5,181,807 | 1/1993 | Anders | 406/190 |
| 5,215,412 | 6/1993 | Rogoff et al. | 406/112 |
| 5,299,891 | 4/1994 | Grosswiller et al. | 406/112 |
| 5,562,367 | 10/1996 | Scott | 406/13 |

*Primary Examiner*—Andrew C. Pike
*Attorney, Agent, or Firm*—D. Peter Hochberg; Mark Kusner

[57] ABSTRACT

A blower assembly for a pneumatic transfer tube system alternately creates a pressure or a vacuum in a transfer tube. The blower is comprised of a housing having an internal cavity and a first and a second external port communicating with the cavity. A movable plate divides the internal cavity into two chambers which are generally isolated from each other. A blower having a vacuum end and a pressure end is mounted to the plate, wherein the vacuum end is on one side of the plate and the pressure end is on the other side of the plate. The blower when operating creates a pressure chamber on one side of the plate and a vacuum chamber on the other side of the plate. A drive assembly attached to the plate moves the plate between a first position wherein the pressure chamber is in communication with the first port and the vacuum chamber is in communication with the second port, and a second position wherein the pressure chamber is in communication with the second port and the vacuum chamber is in communication with the first port. A weight sensitive assembly having a weight sensitive carrier support element is provided for underground pneumatic robe systems to prevent an overweight carrier from entering an underground transfer tube.

26 Claims, 10 Drawing Sheets

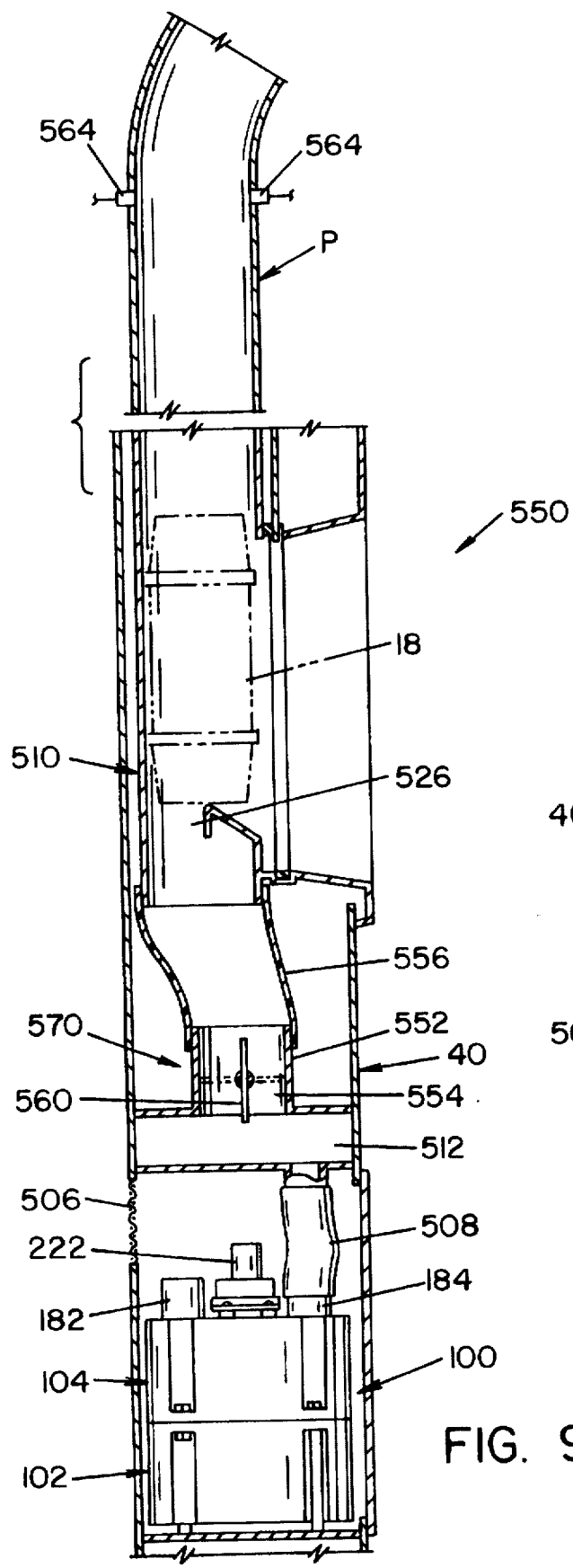
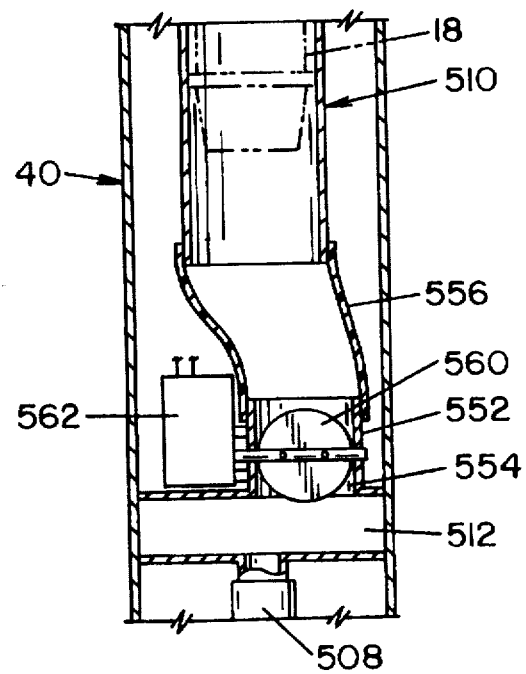
FIG. 9
FIG. 10

PNEUMATIC TUBE SYSTEM AND BLOWER ASSEMBLY

FIELD OF THE INVENTION

The present invention relates generally to a system for transferring articles between two locations, and more particularly, to a pneumatic tube system for conveying articles in a carrier through a tube between two terminals. The present invention is applicable to banking operations in which a carrier is transferred through a tube between a customer terminal and teller terminal, and will be described with particular reference thereto. The present invention, however, may find advantageous application in other fields where it is desirable to transfer objects between two locations.

BACKGROUND OF THE INVENTION

In recent years, pneumatic transfer systems have found increasing use in many areas, including banking institutions where such systems are used to conduct banking transactions between a bank teller and a remote customer. Documents and currency are transferred between the teller and customer in a pneumatically driven, generally cylindrical carrier, through a tube connecting a teller terminal to a customer terminal. Pneumatic transfer systems in present day use are generally of two types, i.e., captive carrier systems and noncaptive carrier systems. A noncaptive carrier system is one in which the carrier may be removed from the system to enable a user to insert articles therein, or to remove articles therefrom.

U.S. Letters Pat. No. 5,299,891 to Grosswilier et al. discloses a pneumatic tube system used at banking institutions. This system includes terminals having generally cylindrical housings which define a "carrier receiver". The customer terminal and teller terminal are connected by an overhead transfer tube. Two separate blower assemblies are connected to the transfer tube above the terminals to operatively establish a vacuum within the transfer tube to transfer the carrier between the terminals.

A problem with the foregoing patents is that the location of the overhead blowers creates a slight inconvenience when maintenance of the blowers is required. In addition, the need for two blowers and control circuitry for same increases the cost of the overall system.

U.S. Letters Pat. Nos. 4,315,704; 4,251,169; and 4,189,261 to Kelley et al. disclose a pneumatic transfer tube system utilizing a single vacuum/blower assembly for transferring a carrier between the respective terminals. A movable plate connects a flexible tube to the transfer tube to alternatively create either a pressure or vacuum within the transfer tube system to convey the carrier therethrough. U.S. Pat. No. 4,135,684 to Willey also discloses a single tube pneumatic tube system which utilizes a stationary blower assembly and a shifter valve to create a vacuum or pressure in the transfer tube system to convey the carrier therethrough. With respect to these latter patents, while they disclose single vacuum/blower assemblies, the overall systems are bulky, and do not lend themselves to space requirements necessary at banking institutions.

The present invention overcomes these and other problems and provides a single line pneumatic tube system having a single, reversible pressure/vacuum blower assembly, which assembly is compact and positioned within a narrow terminal housing.

SUMMARY OF THE INVENTION

In accordance with a preferred embodiment of the present invention, there is provided a system for pneumatically transferring articles between two spaced-apart locations including a first terminal and a second terminal, each terminal having a carrier access opening therein, and an overhead transfer tube connecting the first terminal to the second terminal. A noncaptive, tubular carrier is positionable within the transfer tube to be pneumatically transferred through the tube between the first and second terminals, the carrier being manually insertable and removable from the terminals through the access openings. A gate member is provided and is movable between a first position closing the access opening and a second position removed from the access opening. A blower assembly within one of said terminals is operable to create alternately a pressure or a vacuum in the transfer tube. The blower assembly is comprised of a housing having an internal cavity and a first and a second external port communicating with the cavity. A movable separating member divides the cavity into two chambers which are generally isolated from each other. A blower having a vacuum end and a pressure end is mounted to the member wherein the vacuum end is on one side of the separating member and the pressure end is on the other side of the separating member. The blower when operating creates a pressure chamber on one side of the separating member and a vacuum chamber on the other side of the separating member. A drive assembly is provided for moving the separating member between a first position, wherein the pressure chamber is in communication with the first port and the vacuum chamber is in communication with the second port and a second position, wherein the pressure chamber is in communication with the second port and the vacuum chamber is in communication with the first port.

In accordance with another aspect of the present invention, there is provided a system for pneumatically transferring articles between two spaced-apart locations including a first terminal and a second terminal each having a carrier access opening therein. An overhead transfer tube connects the first terminal to the second terminal, and a noncaptive, tubular carrier is positionable within the transfer tube to be pneumatically transferred through the tube between the first and second terminals, the carrier being manually insertable into and removable from the terminals through the access openings. A gate member is movable between a first position closing the access opening and a second position removed from the access opening. A blower assembly within one of the terminals is operable to create alternately a pressure or a vacuum in the transfer tube. The blower assembly is comprised of a housing having an internal cavity and a first and a second external port communicating with the cavity. First and second isolated chambers are defined in the cavity, and the chambers are movable between a first position wherein the first port communicates with the first chamber and the second port communicates with the second port, and a second position wherein the first port communicates with the second chamber and the second port communicates with the first chamber. Pressure means are provided for producing a negative pressure in the first chamber and a positive pressure in the second chamber.

In accordance with another aspect of the present invention, there is provided a system for pneumatically transferring articles between two spaced-apart locations including a first terminal and a second terminal each having an access opening communicating with a carrier receiver therein. An overhead transfer tube connects the carrier receiver in the first terminal to the carrier receiver in the second terminal. A noncaptive, tubular carrier is positionable within the transfer tube to be pneumatically transferred through the tube between the first and second terminals, the carrier being manually insertable into and removable from the carrier receiver through the access openings. A gate mechanism is provided on each of the terminals and includes a generally planar gate member movable between a first position closing the access opening and a second position removed from the access opening. A blower assembly having a first port and a second port is provided. The first port communicates with one side of the carrier receiver and the second port communicates with the other side of the carrier receiver. The blower assembly has a first operating condition wherein a pressure is created at the first port and a vacuum is created at the second port, and a second operating condition wherein a vacuum is created at the first port and a pressure is created at the second port. A control system controls when the blower assembly operates in the first operating condition or in the second operating condition.

It is an object of the present invention to provide a point-to-point pneumatic transfer system.

Another object of the present invention is to provide a pneumatic transfer system as described above, which is compact and particularly applicable as a banking system for transferring articles between a teller and a remote customer.

Another object of the present invention is to provide a pneumatic transfer system as described above, Which utilizes a single cylindrical tube and a noncaptive cylindrical carrier therein.

Another object of the present invention is to provide a pneumatic transfer system as described above having a single blower assembly for transferring the carrier between two terminals.

Another object of the present invention is to provide a pneumatic transfer system as described above, wherein the single blower assembly is located within one of the two terminals.

Another object of the present invention is to provide a pneumatic transfer system as described above, wherein the single blower assembly includes a single blower.

Another object of the present invention is to provide a pneumatic transfer system as described above, wherein at least one of the terminals is generally comprised of cylindrical housing, and the blower motor assembly is dimensioned to be disposed within the cylindrical terminal housing.

Another object of the present invention is to provide a pneumatic transfer system as described above, wherein the blower motor assembly is compact and streamlined.

Another object of the present invention is to provide a pneumatic transfer system as described above, which can be configured for overhead or underground operation.

A still further object of the present invention is to provide a pneumatic transfer system as described above for transferring a carrier underground, and the system includes a weight sensitive assembly which prevents an overweight carrier from entering the underground transfer tube.

A still further object of the present invention is to provide a pneumatic transfer system as described above, wherein said weight sensitive assembly includes a movable support element for supporting a carrier, which support element is not movable if a force exceeding a predetermined limit is exerted thereon.

A still further object of the present invention is to provide a blower motor assembly for mounting within a pneumatic tube system, which assembly includes a single blower motor and a movable plate, wherein the position of the plate establishes whether a positive or negative pressure exists within the transfer tube.

These and other objects will become apparent from the following description of preferred embodiments taken together with the accompanying drawings and the appended claims.

BRIEF DESCRIPTION OF THE DRAWINGS

The invention may take physical form in certain parts and arrangement of parts, preferred embodiments of which will be described in detail in the specification and illustrated in the accompanying drawings which form a part hereof, and wherein:

FIG. 9 is a side elevational view of a terminal for a pneumatic transfer system illustrating another embodiment of an overhead transfer arrangement;

FIG. 10 is an enlarged side view of the valve arrangement shown in FIG. 9; and

DETAILED DESCRIPTION OF PREFERRED EMBODIMENTS

Figure 1:
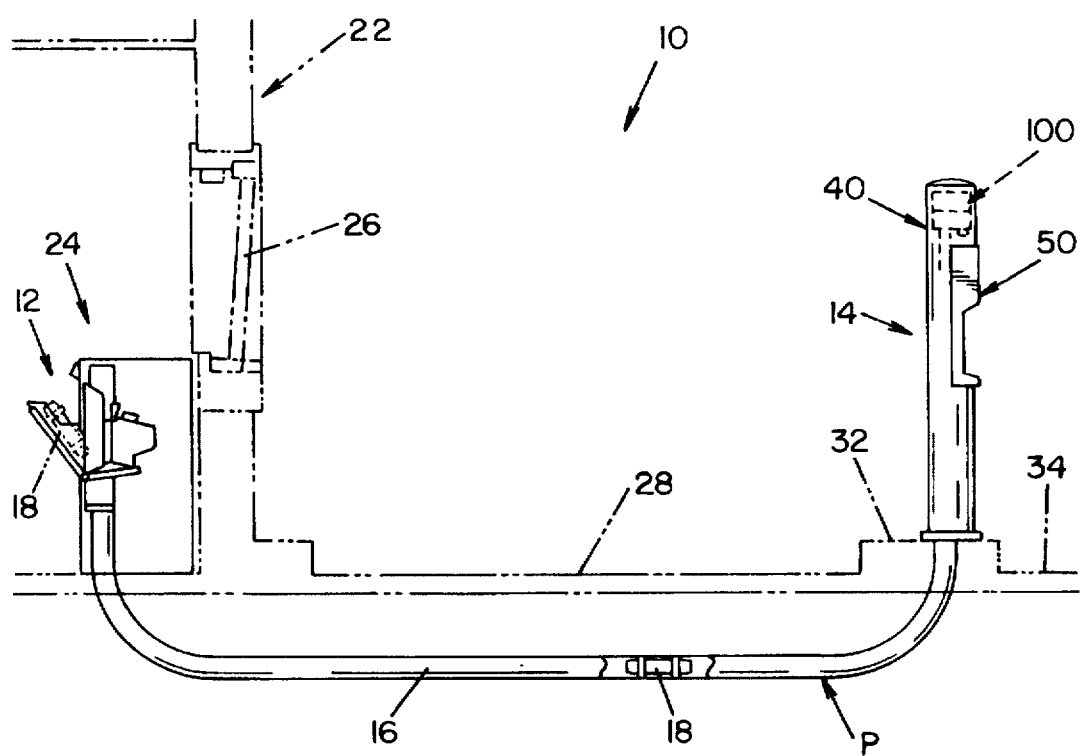
FIG. 1 is a side elevational view of a pneumatic transfer system for use in a banking operation illustrating a preferred embodiment of the present invention.

Referring now to the drawings wherein the showings are for the purpose of illustrating preferred embodiments of the invention only, and not for the purpose of limiting same, FIG. 1 shows a point-to-point pneumatic transfer system 10 according to the present invention for use in a banking operation. System 10 is basically comprised of a teller terminal 12 and a customer terminal 14, which are connected by an underground transfer tube 16. Transfer tube 16 is cylindrical in shape and is dimensioned to receive a cylindrical carrier 18. Carrier 18 is adapted to carrying articles through transfer tube 16 between teller terminal 12 and customer terminal 14, and to be removable from such terminals 12, 14, i.e., carrier 18 is a "noncaptive" carrier.

Carrier 18, in and of itself, forms no part of the present invention, and therefore, is not shown in great detail. Broadly stated, carrier 18 is comprised of a tubular body portion having frustoconical end portions. Adjacent each end portion is an annular surface dimensioned to have an outer diameter which closely approximates the inner diameter of the transfer tube. These annular surfaces, conventionally referred to as "accelerator rings", generally seal the carrier against the inner surface of transfer tube 16. The tubular body portion of carrier 18 defines an internal cavity (not shown) for containing the articles to be transferred. Access to the internal cavity may be by a laterally pivotal end cover or flap, by a threaded, removable end cap, or by a side door through the tubular portion of the carrier.

Teller terminal 12 is positioned within a teller building 22 at a teller station 24 having a window 26 which provides a view out across a first vehicle lane 28 to customer terminal 14. Customer terminal 14 is mounted on an island 32 which defines a second vehicle lane 34 (partially shown in FIG. 1). Island 32 elevates customer terminal 14 a predetermined distance above the surface of vehicle lanes 28, 34. Transfer tube 16 is generally comprised of a plurality of tube sections (not shown) which are fastened together by tube connection clamps (not shown). The tube sections are connected to each other in a manner to ensure a smooth continuous inner cylindrical passageway, designated "P" in the drawings. In the embodiment disclosed in the specification, transfer tube is formed of commercially available tubing having a nominal 4⅛" inner diameter. As will be appreciated from a further reading and understanding of the specification and the disclosed embodiments, the present invention is not limited to a specific commercially available tube size, and in this respect, tubing larger or smaller than 4⅛" may be used and find advantageous application with the present invention. As shown in FIG. 1, transfer tube 16 is disposed beneath vehicle lane 28. Transfer tube 16 is preferably disposed within a trench (not shown) communicating teller building 22 with customer terminal 14. Removable surface grating (not shown) may be used to enclose the upper portion of the trench, in a manner as conventionally known.

Referring now to terminals 12, 14, such terminals are similar in structure to those disclosed in U.S. Pat. No. 5,299,891 to Grosswilier et al., and U.S. Pat. No. 4,352,603 to Anders, which patents are assigned to Diebold, Incorporated, assignee of the present application. The disclosures of U.S. Pat. Nos. 5,299,891 and 4,352,603 are hereby incorporated by reference in their entirety for showing the general construction of teller terminal 12 and customer terminal 14. Teller terminal 12 is identical to that disclosed in aforementioned U.S. Pat. No. 4,352,603. Customer terminal 14 is similar in many respects to that disclosed in U.S. Pat. No. 5,299,891.

Figure 2:
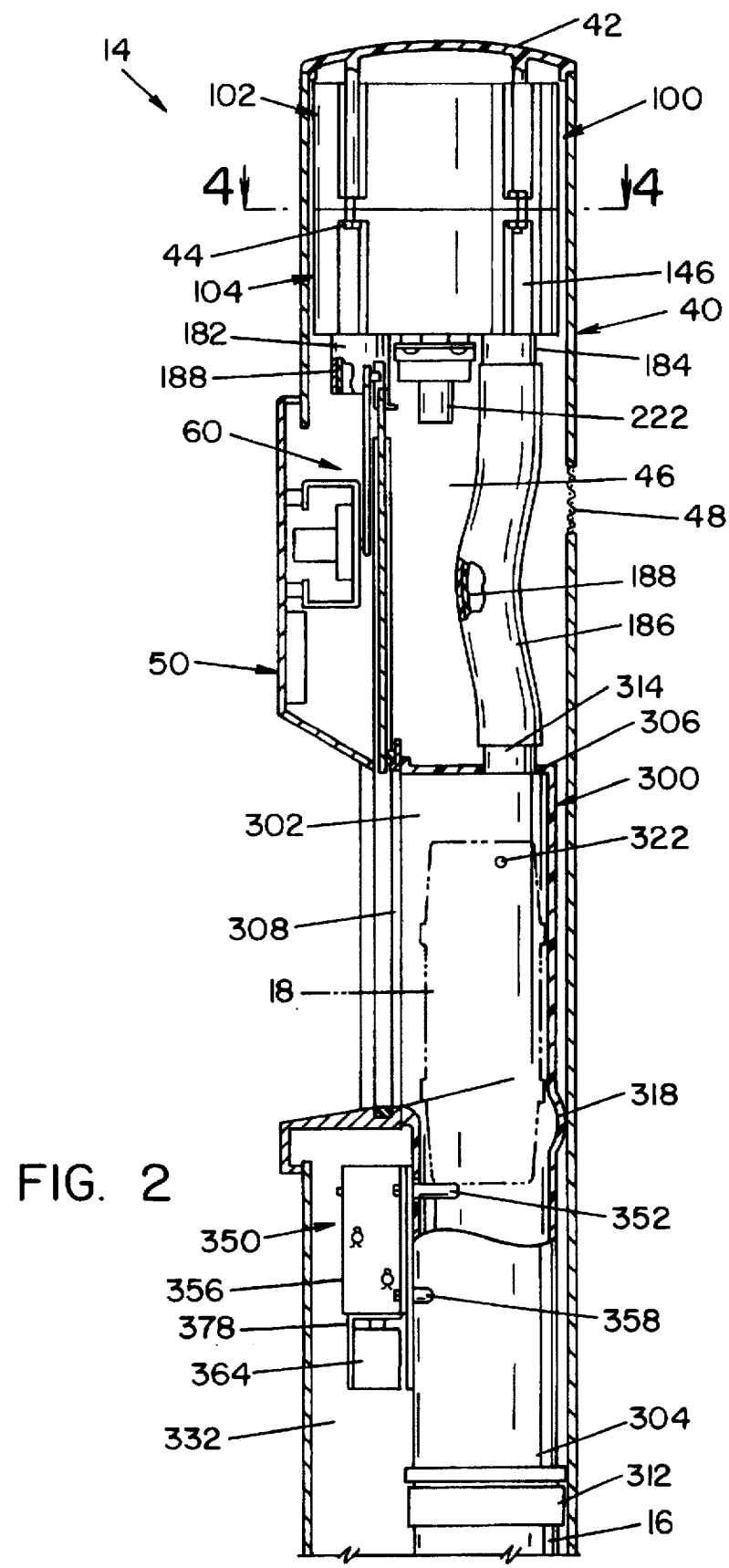
FIG. 2 is an enlarged sectional view of a customer terminal from the pneumatic transfer system shown in FIG. 1.

Customer terminal 14 includes an outer housing 40, a facade 50, and gate mechanism 60, which are essentially identical to those shown in U.S. Pat. No. 5,299,891. Accordingly, these components shall not be described in great detail. Customer terminal 14 differs from that shown in U.S. Pat. No. 5,299,891 primarily in that it is adapted for use in an underground pneumatic tube system and contains a reversible blower assembly 100, as shown in FIG. 2. Blower assembly 100 is operable to propel carrier 18 between teller terminal 12 and customer terminal 14. The positioning of blower assembly 100 within customer terminal 14, and the underground configuration of transfer system 10 produces other changes which will be described in detail below.

Figure 3:
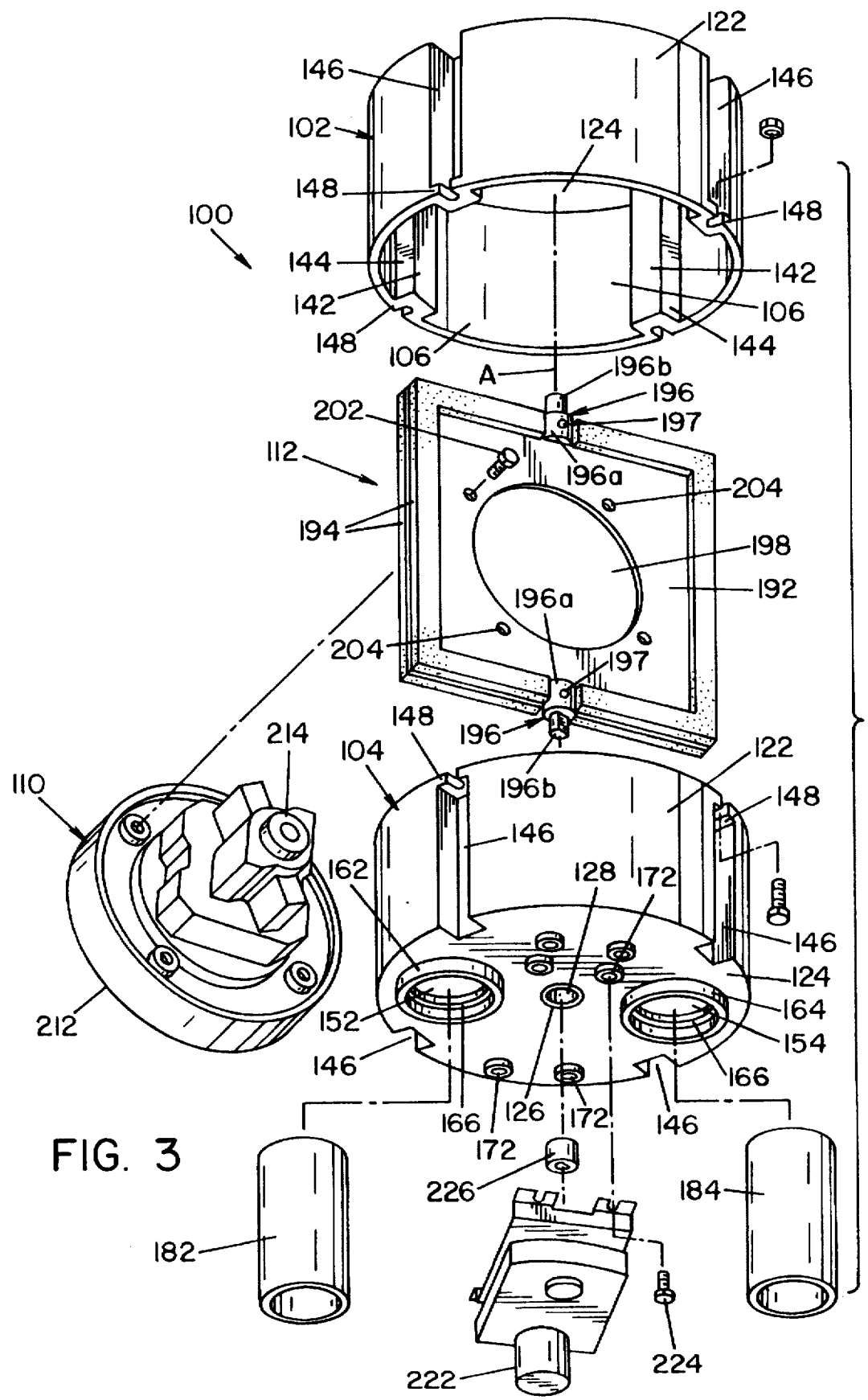
FIG. 3 is an enlarged exploded view of a blower assembly from the pneumatic system shown in FIG. 1.

Referring now to FIG. 3, blower assembly 100 is shown in exploded view. Blower assembly 100 is basically comprised of a first housing section 102 and a second housing section 104, which define an internal cavity 106 dimensioned to receive a blower 110 mounted to a plate 112. Housing sections 102, 104 are basically similar, and therefore, only second housing section 104 (which is best illustrated in the drawings) shall be described in detail, it being understood that like parts on first housing section 102 are designated with like reference numbers.

Figure 4:
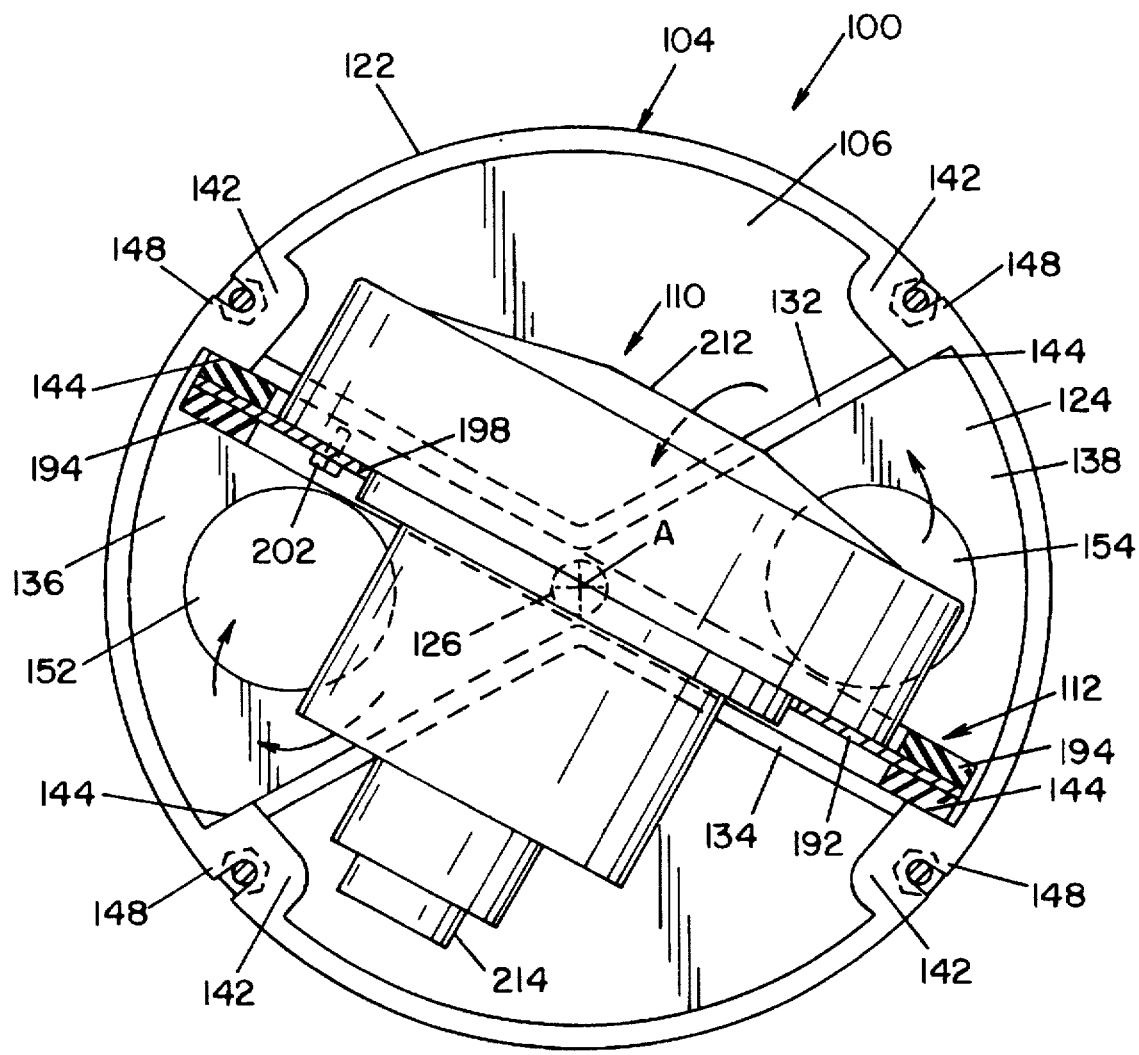
FIG. 4 is an enlarged sectional view of the assembled blower assembly taken along lines 4—4 of FIG. 2, illustrating a first operating condition.

Second housing 104 is generally comprised of a cylindrical wall portion 122 which is closed at one end by a planar end wall portion 124. Cylindrical wall portion 122 is generally symmetrical about a central axis, designated "A" in the drawings. A circular aperture 126 is centrally located through planar wall portion 124. Aperture 126 is dimensioned to receive a bearing bushing 128. Two V-shaped walls 132, 134 (best seen in FIGS. 4 and 5) are formed on the inner surface of planar end wall portion 124 on opposite sidles of aperture 126. The apex of each V-shaped walls 132, 134 is disposed adjacent aperture 126 with the wall portions extending radially outward towards cylindrical wall portion 122. V-shaped walls 132, 134 are positioned such that one leg portion of each wall is parallel to and offset from a leg portion of the other wall. In this respect, V-shaped walls 132, 134 form pie-shaped regions 136, 138 on opposite sides of aperture 126. The outer ends of V-shaped walls 132, 134 communicate with columnar ribs 142 formed along the inner surface of cylindrical wall portion 122. Columnar ribs 142 extend parallel to axis A and include planar surfaces 144 which are coplanar with one side of V-shaped walls 132, 134, as best seen in FIG. 4. In the embodiment shown, ribs 142 are formed to have a generally U-shaped cross section and to define elongated channels 146 along the outer surface of cylindrical wall portion 122, as best seen in FIG. 3. A slotted wall 148 is formed at the end of each channel 146 at the open end of housing sections 102, 104. Channels 146 and slotted walls 148 are dimensioned to receive conventional fasteners to secure first and second housing sections together, in a manner which is conventionally known.

First and second housing sections 102, 104, as heretofore described, are generally identical in shape and configuration. Second housing section 104 differs from first housing section 102 in that second housing section 104 includes two (2) spaced-apart apertures 152, 154 formed in planar end wall portion 124. Aperture 152 is disposed within pie-shaped region 136 and aperture 154 is disposed in pie-shaped region 138, as best seen in FIG. 4. The outer surface of planar end wall portion 124 of second housing section 104 is formed to include two cylindrical sleeves 162, 164 concentric with apertures 152, 154. Sleeves 162 are dimensioned to be slightly larger in diameter than apertures 152, 154 so as to define a lip 166 (best seen in FIG. 3) at the juncture where sleeves 162, 164 engage planar end Wall portion 124. Further according to the present invention, fastener elements 172 are secured to the outer surface of second housing section 104. In this respect, recesses or cavities (not shown) are preferably formed on planar end wall portion 124 to receive fasteners 172. A pair of cylindrical tubes 182, 184 are dimensioned to be positioned within sleeves 162 and to rest upon lip 166. Tubes 182, 184 are secured within sleeves 162 in an airtight fashion.

As indicated above, first housing section 102 and second housing section 104 are preferably formed to be identical. In this respect, both housing sections 102, 104 may initially be formed with sleeves 162 and fastener recesses formed on planar end wall portion 124, but without apertures 152, 154. Apertures 152, 154 may be formed or machined into second housing section 104 later to define the openings through end wall portion 124. In summary, second housing section 104 differs from first housing section 102 only in the formation of apertures 152, 154 and the inclusion of fastening elements 172. In this respect, first and second housing sections 102, 104 may be identically formed, and apertures 152, 154 then machined or otherwise formed in second housing section 104 and tubes 182, 184 and fasteners 172 secured thereto. Preferably, first and second housing sections 102, 104 are of molded plastic construction, each having fastener recesses molded therein. Apertures 152, 154 may be formed in second housing section 104 by placing cylindrical inserts (not shown) in the forming mold. Tubes 182, 184 are also preferably formed of a plastic composition, and therefore, may be secured by adhesive, induction welding, or other means.

First housing section 102 and second housing section 104 are formed to be joined together by conventional fasteners extending through the slots in walls 148. First and second housing sections 102, 104 define a housing wherein cylindrical inner cavity 106 is interrupted only by columnar ribs 142. In this respect, columnar ribs 142 of first housing section 102 and second housing section 104 are aligned when such housing sections 102, 104 are assembled such that V-shaped walls 132, 134 on first housing section 102 are in registry with V-shaped walls 132, 134 on second housing section 104.

A rectangular plate 192 is dimensioned to be disposed within cavity 106 defined by first and second housing sections 102, 104. Plate 192 is dimensioned to have a length slightly smaller than the axial distance between the inner surfaces of end wall portions 124 of first and second housing sections 102, 104, and to have a width only slightly smaller than the diameter of the inner surface of cylindrical wall portions 122. Seal elements 194 are disposed along the outer periphery of plate 192, on both sides thereof. Seal elements 194 are preferably formed of a resilient compressible material, such as neoprene. Pins 196 are mounted to the plate 192 at its midsection. Pins 196 are formed to have an elongated cylindrical section 196a and a reduced cylindrical section 196b. Enlarged cylindrical section 196a of pin 196 is split to receive an edge of the plate 192 (not shown). A set screw 197 extends into one side of enlarged cylindrical section 196a to secure pin 196 to plate 192. The reduced pin section 196b is dimensioned to be disposed within bushings 128 in apertures 126 in first and second housing sections 102, 104. Bushings 128 within aperture 126 in housing sections 102, 104 facilitate mounting and rotation of pins 196 therein. Blower motor 110 is mounted onto plate 192. In this respect, blower motor 110 is positioned within a cylindrical opening 198, which is formed in plate 192. Opening 198 is dimensioned to mate with a cylindrical body portion on blower 110. Conventional fasteners 202 extend through apertures 204 in plate 192 and are threaded into mounting openings formed in blower 110. Blower 110 includes an input end 212 and an output end 214, best seen in FIGS. 4 and 5. When blower 110 is operating, low pressure, i.e., a vacuum, is created at input end 212 and high pressure is created at the output end 214.

Figure 5:
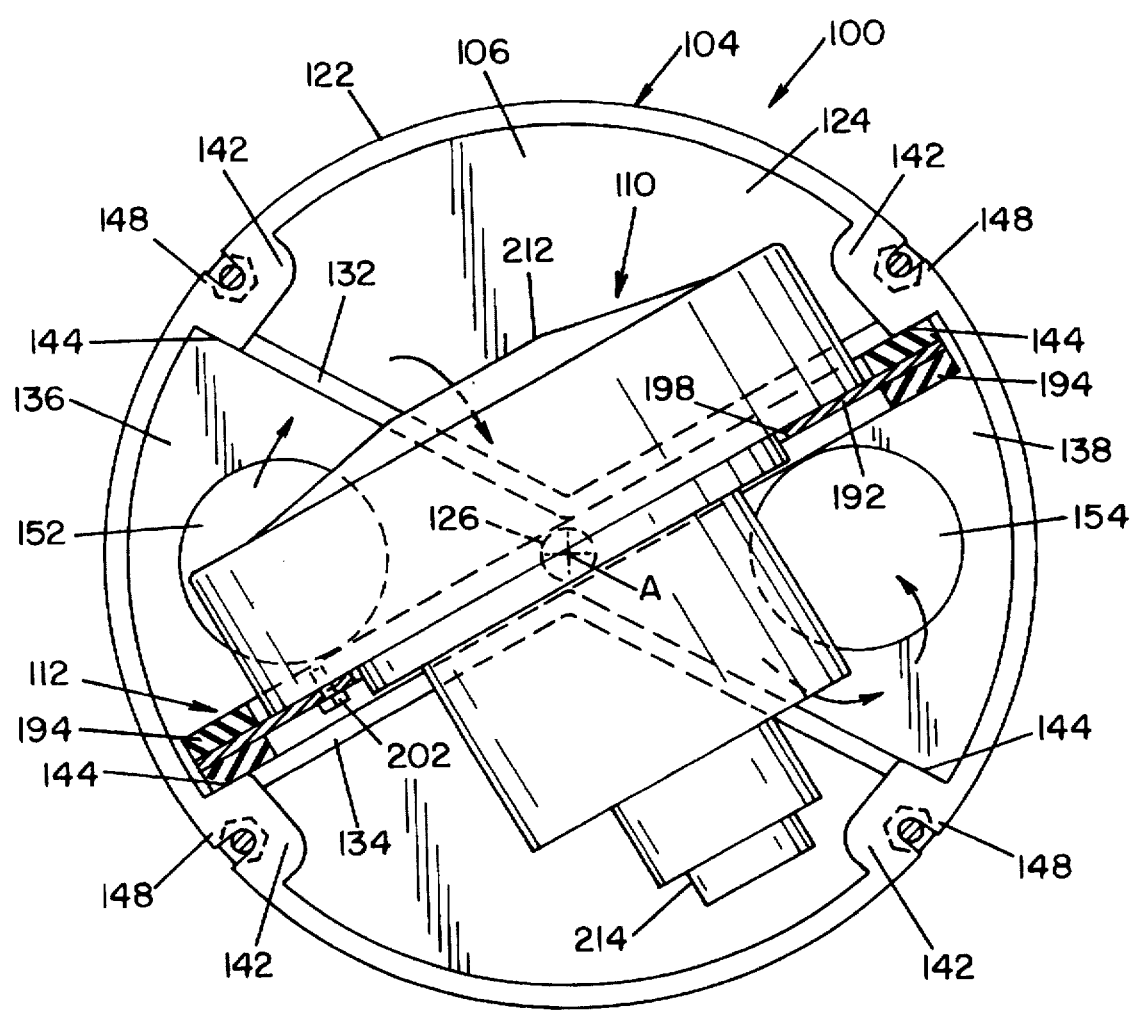
FIG. 5 is an enlarged sectional view of the assembled blower assembly similar to that of FIG. 4, illustrating a second operating condition.

Plate 192 with blower motor 110 thereon is mounted within first and second housing sections 102, 104 with pins 196 extending through bushings 128 in apertures 126. Plate 192 is disposed between V-shaped walls 132, 134 with seal elements 194 in contact with parallel portions of such walls 132, 134, as best seen in FIGS. 4 and 5. Plate 192 bisects the inner cavity 106 defined by housing sections 102, 104 into two separate chambers. Engagement between the seal elements 194 on plate 192 and ribs 142 and V-shaped walls 132, 134 effectively isolates one chamber from the other. In this respect, the chamber on the low pressure side of plate 192 (input side of blower 110) is isolated from the chamber on the high pressure side of plate 192 (output side of blower 110).

A reversible drive motor 222 is mounted to second housing section 104 by fasteners 224 extending into fastener elements 172 mounted to the exterior end wall portion 124.

Drive motor 222 is basically comprised of a reversible electric DC motor of variable speed and torque, wherein the speed and torque will change proportionately to a change in applied voltage. In the embodiment shown, 24-volt permanent magnetic DC gear motor operable at 20 revolutions per minute (rpm) with a maximum torque of 150 ounce-inches, manufactured by Barber Coleman, Inc. is used. A coupler 226 attaches drive motor to pin 196 on plate 192 in conventional fashion. Drive motor 222 is operable to move plate 192 between a first operating position as shown in FIG. 4 and a second operating position as shown in FIG. 5. In the first operating position, aperture 152 communicates with the high pressure chamber (output end 214 of blower 110) within blower assembly 100 and aperture 154 communicates with the low pressure chamber (input end 212 of blower 110) within blower assembly 100, as illustrated in FIG. 4. In its second position, aperture 152 communicates with the low pressure chamber (input end 212 of blower 110) and aperture 154 communicates with the high pressure chamber (output end 214 of blower 110), as best illustrated in FIG. 5. Basically, one side of plate 192 defines a vacuum chamber and another side of plate 192 defines a pressure chamber, and as plate 192 is moved by drive motor 222, the respective chambers move within housing sections 102, 104 from one position to another relative to apertures 152, 154.

Referring now to FIG. 2, blower motor assembly 100 is adapted for mounting within customer terminal 14. Blower motor assembly 100 is mounted to a cap 42 by elongated bolts 44 extending into fastener elements molded within cap 42. In the embodiment shown, aperture 152 communicates, via tube 182, with a cavity 46 defined within housing 40, which, in turn, communicates with the atmosphere through a vent 48 extending through housing 40. Aperture 154 communicates, via tube 184, with a carrier receiver 300 by means of a flexible hose 186. Hose 186, as well as tubes 182, 184, are preferably lined with a sound-absorbing material, designated 188 in the drawings.

Carrier receiver 300 is generally tubular in shape and defines an inner carrier receiving chamber 302 which is dimensioned to receive carrier 18 therein and to operatively align carrier 18 with transfer tube 16 to facilitate transfer of carrier 18 therethrough. To this end, carrier receiver 300 has a lower end 304 defining an opening which communicates with transfer tube 16, an upper end 306 communicating with tube 186, and an access opening 308 to permit insertion and removal of carrier 18 to and from the receiving chamber 302.

More specifically, the lower end 304 of the receiver 300 is substantially cylindrical in shape and has an inner diameter corresponding to the inner diameter of transfer tube 16, and in this respect, represents basically an extension of transfer tube 16. An enlarged annular collar 312 is provided at lower end 304 of receiver 300 to permit alignment with transfer tube 16. Upper end 306 of receiver 300 is formed to include a tube 314 for connection to hose 186, as seen in FIG. 2.

Access opening 308 is generally rectangular in shape and extends laterally from the axis of carrier receiver 300. Access opening 308 extends toward the front of terminal 14, i.e., toward facade 50. The general shape of access opening 308 is best illustrated and described in aforementioned U.S. Pat. No. 5,299,891, which is incorporated herein by reference. In this respect, access opening 308 is dimensioned to have a width sufficient to enable a customer's hand, while holding carrier 18, to pass therein so as to permit removal or insertion of carrier 18 into carrier receiver 300. To facilitate insertion of carrier 18 into carrier receiver, an outwardly projecting relief or recess 318 is formed in the rear portion of receiver to enable the lower end portion of carrier 18 to be inserted and turned therein. Opposed infrared (IR) sensors 322 are provided on opposite sides of carrier receiver 300 near the upper end thereof. Sensors 322 (only one of which is shown in FIG. 2) are arranged to create an infrared (IR) beam across the upper end of carrier receiver 300.

Figure 6:
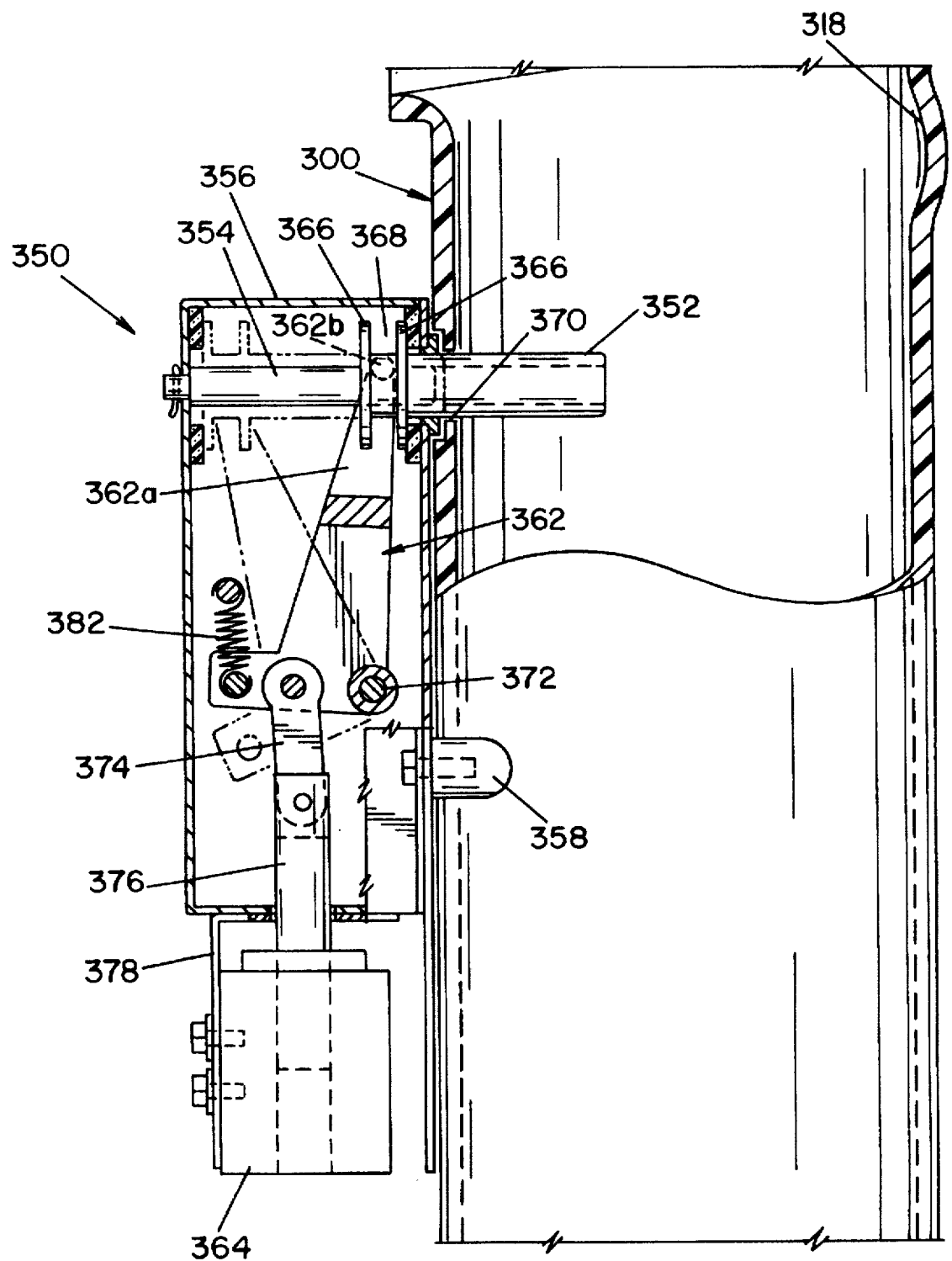
FIG. 6 is an enlarged, sectional view of a carrier support assembly.

A carrier support assembly 350 is provided in a cavity 332 defined between carrier receiver 300 and housing 40. Carrier support assembly 350, best seen in FIG. 6, is provided to support and maintain carrier 18 in carrier receiver 300 in a position to allow access thereto by a customer. In the embodiment shown, carrier support assembly 350 is generally comprised of a tubular support element 352 movable on a cylindrical support pin 354 which is mounted to a housing 356. Housing 356 is attached to carrier receiver 300 by conventional fastener extending into mounting bosses 358 formed on the exterior surface of carrier receiver 300. A lever arm 362 is movable by a solenoid 364 to control movement of support element 352.

Support element 352 is a cylindrical tube having spaced-apart annular flanges 366 at one end thereof. Flanges 366 define an annular gap 368 therebetween. Support element 352 is dimensioned to extend through an opening 370 formed in carrier receiver. Support element 352 is designed to reciprocally move along support pin 354. Support pin 354 is mounted to the back of housing 356 in a manner to allow articulated movement of support pin 354.

Lever 362 is generally L-shaped and is mounted to housing 356 on a pivot pin 372 for pivotal movement thereabout. Lever 362 includes a forked end 362a having inward extending pins 362b dimensioned to be positioned within annular gap 368. The other end is connected to a link 374 which in turn is connected to a shaft 376 of solenoid 364. Solenoid 364 is supported on a bracket 378 extending from housing 356. A biasing spring 382 is attached at one end to a pin mounted to housing 356 and at the other end to a pin on lever arm 362. Lever arm 362 is biased toward a first position wherein support element 352 projects into carrier receiver 300 (as shown in FIG. 6). Solenoid 364 is operable to move support element 352 from its normal first position to a second position where support element 352 is withdrawn from carrier receiver 300 (shown in phantom in FIG. 6).

Importantly, according to one aspect of the present invention, carrier support assembly 350 is designed to prevent movement of support element 352 from its first position to its second position when an excessive amount of weight is exerted thereon. In the embodiment shown, carrier support assembly 350 is dimensioned to bind if weight exerted on support element 352, when support element 352 is in its first position, exceeds a predetermined amount. In the embodiment shown, solenoid 364 and lever 362 have been dimensioned to exert a predetermined force on support element 352. The force exerted by solenoid 364, however, is not sufficient to withdraw support element 352 to the second position, if the weight exerted upon support element 352 exceeds a range of about 5 to 8 lbs, and preferably approximately 6 lbs.

Referring now to the operation of system 10, an electrical controller (not shown), preferably a microprocessor, establishes the operating sequence of system 10. System 10 operates in a predetermined sequence based upon operating commands stored in the controller, and based upon control switches on customer terminal 14 and teller terminal 12. Power to system 10 is initiated by the bank teller on teller terminal 12. When energized, system 10 will typically have an initial configuration wherein carrier 18 is in teller terminal 12 with the panel on teller terminal 12 in an open position. Customer terminal 14, at this time, will have the gate member in a downed position covering access opening to transfer tube 16. Transfer of carrier 18 from teller terminal 12 to customer terminal 14 is accomplished by inserting carrier 18 into the carrier receiving chamber of teller terminal 12. With carrier 18 within the panel of teller terminal 12, the teller may initiate transfer of carrier 18 to customer terminal 14 by merely closing the panel. By means of contact switches provided on teller terminal 12, the closing of the panel initiates a SEND sequence. Specifically, closing of the panel on the teller terminal 12 initiates blower assembly 100 in customer terminal 14. Blower 110 would typically be in its first position (as shown in FIG. 4). When blower 110 is actuated, it creates a negative pressure, i.e., a vacuum, in carrier receiver 300. Specifically, in its first position as shown in FIG. 4, the vacuum side of plate 192, i.e., the vacuum chamber, communicates with aperture 154 which communicates with the carrier receiver 300 by means of tube 184 and hose 186; In effect, blower 110 evacuates air from passage P of transfer tube 16. As a result, a vacuum is drawn in front of carrier 18 in passage P. Air is permitted into teller terminal 12 behind the carrier 18 through a vent in teller terminal 12. The atmospheric pressure behind the carrier provides the impetus for moving carrier 18 through the transfer tube 16.

As carrier 18 moves through transfer tube 16, it eventually enters carrier receiver 300 of customer terminal 14. As the upper end of carrier 18 approaches the upper end of carrier receiver 300, it breaks the infrared beam created by sensors 322. As the carrier 18 trips the infrared beam, the controller causes support element 352 of carrier support assembly 350 to move to its first position beneath carrier 18. Simultaneous with the release of the carrier support assembly 350, or at an extremely short interval thereafter, the controller causes blower assembly 100 to shift from its first operating condition to its second operating condition, as shown in FIG. 5. In this position, the pressure side of plate 192, i.e., the pressure chamber communicates with aperture 154. This creates a high pressure above carrier 18 thereby causing it to reverse direction and move downward in carrier receiver 300 against support element 352. Blower 110 is allowed to operate for only a short period sufficient to reverse the direction of carrier 18 and produce a downward force thereon. The aforementioned change in pressure in the carrier receiver chamber 300 after the release of support element 352 is intended to prevent a bouncing or stuttering effect of carrier 18 within the carrier receiver 300. In this respect, it is found that if blower 110 is merely turned "OFF," a lag time exists before blower 110 actually ceases to create negative pressure above carrier 18. In this time interval, air bleeding around the accelerator rings on carrier 18 causes it (i.e., carrier 18) to jump or stutter within carrier receiver 300. To eliminate this condition, blower assembly 100 is shifted from its first operating condition to its second operating condition to physically force carrier 18 against support element 352 by creating a pressure thereabove. This sequence prevents the stuttering and jumping of carrier 18 within carrier receiver 300.

After a predetermined period of time sufficient for carrier 18 to settle against support element 352, the controller causes the gate member of customer terminal 14 to open, thereby allowing access by the customer to carrier 18. (The general operation of the gate mechanism is best described in U.S. Pat. No. 5,299,891.) After blower 110 has been deactivated, drive motor 222 is initiated to cause blower 110 to shift to its first operating condition wherein aperture 154 communicates with the vacuum chamber.

After the customer has inserted documents, currency or other material into carrier 18 (or removes same therefrom), carrier 18 is reinserted into carrier receiver 300 of customer terminal 14. Transfer of carrier 18 to teller terminal 12 is initiated by the customer by hitting a button designated "SEND" (not shown) on customer terminal 14.

According to one aspect of the present invention, system 10 includes an operating sequence to ensure that carrier 18 is not overloaded and that blower assembly 100 has sufficient capacity to push carrier 18 through the underground tube 16 from customer terminal 14 to teller terminal 12. In this respect, as indicated above, carrier support assembly 350 is configured such that a predetermined force (i.e., weight) exerted on support element 352 will cause assembly 350 to bind and prevent withdrawal of support element 352 from the carrier receiver 300. In this respect, blower assembly 100 is in its first operating condition wherein the vacuum chamber communicates with aperture 154, and in turn, to carrier receiver 300. Blower 110 is initiated to create a vacuum above carrier 18. The effect of the vacuum created above carrier 18 is to lift carrier 18 off of support element 352. Simultaneous with the initiation of blower 110, solenoid 364 is energized to withdraw support element 352 from carrier receiver 300. If the weight of carrier 18 exceeds the capacity of the blower 110, i.e., if blower 110 cannot lift carrier 18 off support element 352 sufficiently to reduce the force on support element 352, support element 352 remains in its extended first position within the carrier receiver 300, thus preventing carrier 18 from dropping into transfer tube 16. According to the present invention, system 10 is programmed such that blower assembly 100 operates in its first operating condition, i.e., producing a vacuum within carrier receiver 300 above carrier 18 for a predetermined period of time. If a signal is not provided by the carrier support assembly 350 that the support element 352 has been withdrawn, operation of blower 110 times out. Blower 110 is then shut down, and a signal is sent to the teller at teller terminal 12 to indicate that transfer sequence has not taken place. At that point, the teller can instruct the customer via telephonic communication that too much weight exists in carrier 18, and request that some of the content be removed, and that the SEND sequence be initiated again.

If an appropriate amount of weight exists within carrier 18, the vacuum exerted above carrier 18 will lift carrier 18 off support element 352. Energizing solenoid 364 causes support element 352 to be removed from carrier receiver 300. The removal of support element 352 generates a signal to the controller, which, in response to the indication support element 352 has been removed, causes blower assembly 100 to shift to its second operating condition, thereby causing the pressure chamber of blower assembly 100 to communicate with aperture 154, thereby creating a pressure within carrier receiver 300 of customer terminal 14, and in turn, within passageway P behind carrier 18. The pressure created behind carrier 18 forces it toward and into teller terminal 12 wherein carrier 18 is captured by a latch assembly within teller terminal 12. Sensing means within teller terminal 12 communicates to the controller that teller terminal has received carrier 18, which in turn, shuts down blower 110. At this point, the teller may open the panel on teller terminal 12 to remove carrier 18 and the contents thereof. The controller causes blower assembly 100 to shift from its second operating condition back to its first operating condition, wherein the vacuum chamber of the blower assembly 100 communicates with aperture 154 and carrier receiver 300 of the customer terminal 14. The system is thus in its initial operating configuration and is ready to repeat the sequence previously described.

The present invention thus provides a transfer system 10 which is relatively compact in relation to the size of carrier 18 used therein, yet is capable of transferring relatively heavy loads due to the efficiency of blower assembly 100. Reversible blower assembly 100 provides a simple structure which is quick and efficient, and less costly and more compact than the cumbersome arrangement heretofore described. Further, carrier support assembly 350 with its designed "binding feature" prevents overweighted carriers 18 from being transferred and thus prevents them from being caught underground within transfer tube 16.

Figure 7:
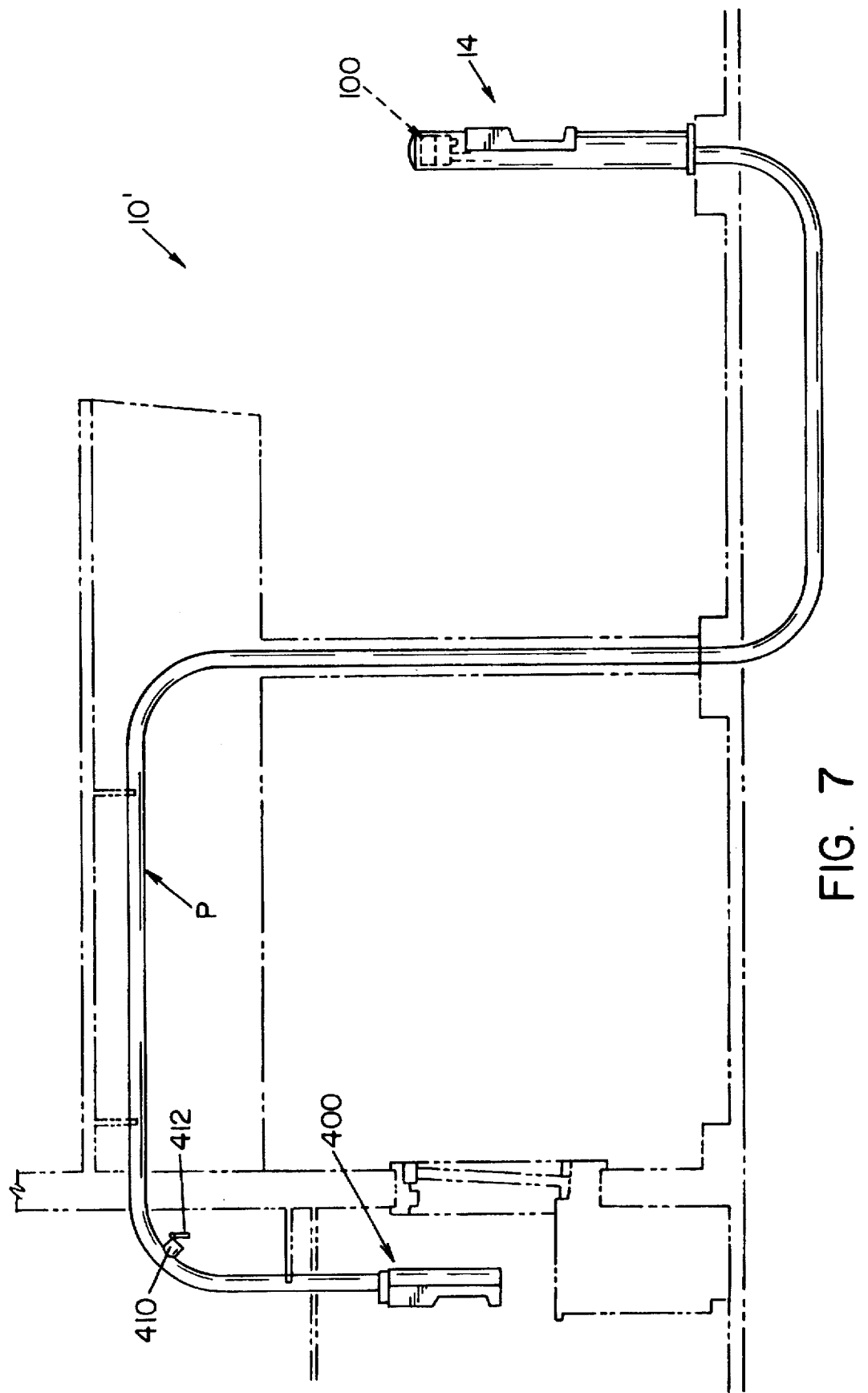
FIG. 7 is a side elevational view of pneumatic transfer system illustrating an alternate embodiment of the present invention.
Figure 8:
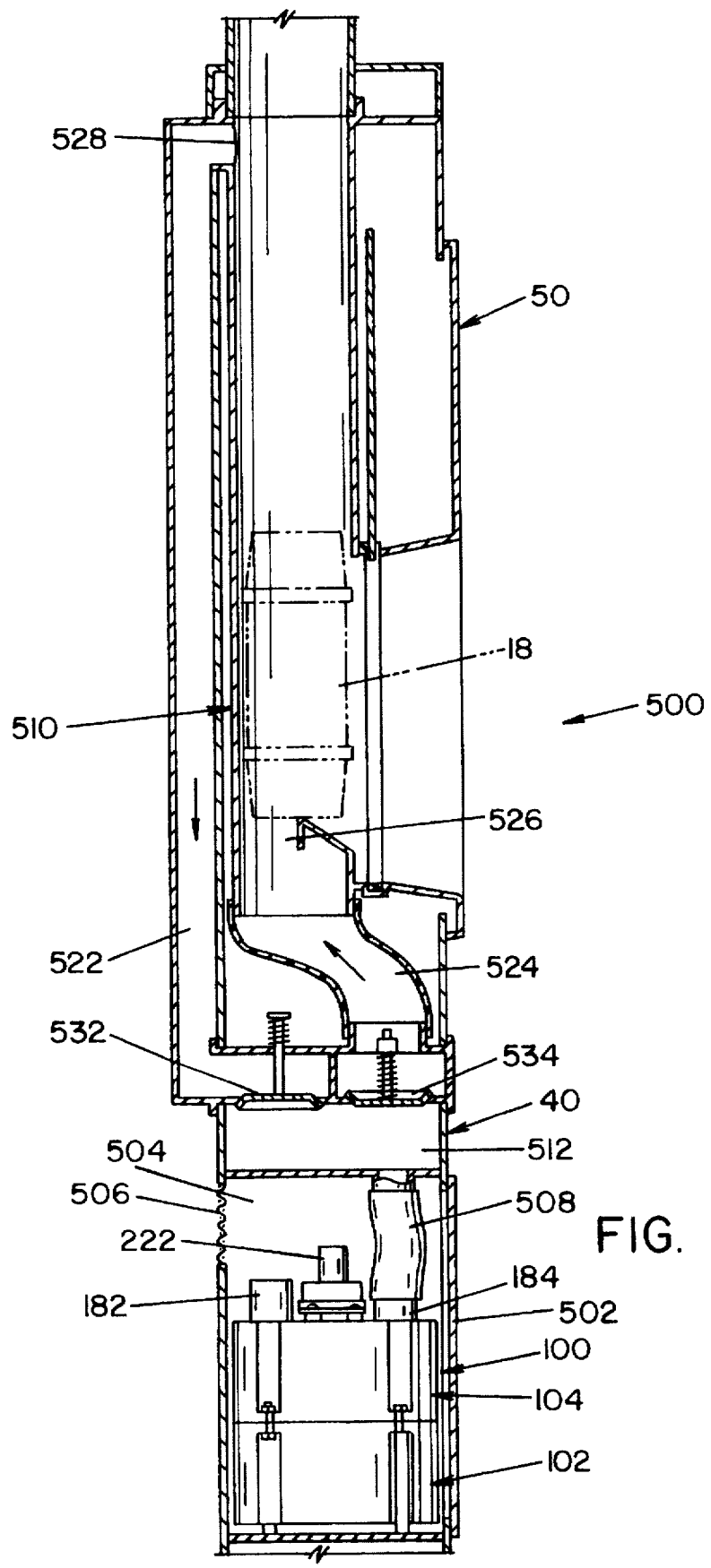
FIG. 8 is a side elevational view of a terminal for a pneumatic transfer system illustrating another embodiment of the present invention.

The present invention has heretofore been described in FIGS. 1–6 with respect to an underground tube system utilizing underground terminals, i.e., terminals connected to a transfer tube at their lower end. FIGS. 7 and 8 illustrate alternate embodiments of the present invention. FIG. 7 shows a pneumatic transfer system 10' utilizing an underground customer terminal 14 and an overhead teller terminal 400. Customer terminal 14 is similar to that heretofore described in FIGS. 1–6, while teller terminal 400 is of a type as described in aforementioned U.S. Pat. No. 5,299,891. An exhaust port 410 and valve 412 are provided in transfer tube P above teller terminal 400. Valve 412 is operable by conventional control and actuating means (not shown) to be in an open position when a positive pressure is established in customer terminal 14 by blower assembly 100 to transfer a carrier from customer terminal 14 to teller terminal 400. In this respect, air in front of a carrier 18 is vented through port 410. As carrier 18 passes exhaust port 410, the positive pressure behind carrier 18 is vented through exhaust port 410, thus reducing the propelling force created by blower assembly 100. At this point, carrier 18 is above teller terminal 400, wherein gravity causes it to drop into teller terminal 400. A cushion of air is created within tube P and carrier receiver by virtue of the terminal and gate assembly design and operation, as described in U.S. Pat. No. 5,299,891. The cushion of air slows the decent of the carrier 18 prior to it engaging the stop within carrier receiver. Valve 412 is in a closed position when blower assembly 100 is operated to create a vacuum in tube P to draw the carrier from teller terminal 400 to customer terminal 14. FIG. 7 thus shows how aspects of the present invention can be used to provide a pneumatic transfer system utilizing single compact reversible blower assembly 100.

Referring now to FIG. 8, an overhead terminal 500 utilizing a reversible blower assembly 100 as previously described is shown. Terminal 500 is similar in many respects to that previously described. Therefore, like components shall be described with like reference numbers. In this respect, the aforementioned described customer terminal is modified such that blower assembly 100 is inserted in the lower portion of housing 40. A removable panel 502 is provided on the lower portion of housing to facilitate insertion, removal, and maintenance of blower assembly 100. Aperture 152, from blower assembly 100, communicates with a cavity 504 located immediately above blower assembly 100, which, in turn, communicates with the atmosphere through vent 506 of housing 40. Aperture 154, via tube 184 and a hose 508, communicates with an airtight chamber 512 defined immediately below a carrier receiver, designated 510. Blower assembly 100 is operable to establish a vacuum or pressure within chamber 512.

Two conduits 522, 524 communicate with chamber 512. Conduit 524 communicates with an opening 526 in the lower portion of carrier receiver 510. Conduit 522, which extends along the outer portion of housing 40, communicates with an opening 528 disposed at the upper end of carrier terminal 500. Spring-biased valves 532, 534 are disposed in conduits 522, 524, respectively. Valves 532, 534 are directional valves, allowing air flow in only one direction. In this respect, valve 534 in conduit 524 is operable to open when pressure is exerted thereon to allow air flow to opening 526 at the lower end of carrier receiver 510. Air flow in the opposite direction (for example, when a vacuum is drawn in chamber 512) is not allowed by valve 534. Conversely, directional valve 532 is operable to allow directional air flow such as when a negative pressure is established in chamber 512, the direction of flow permitted by directional valve 532 is indicated by an arrow.

When a carrier 18 is to be transferred from terminal 500, blower assembly 100 is operated to establish a pressure within cavity 512. Pressure in cavity 512 communicates to the bottom side of the carrier 18 via conduit 524. The pressure below carrier 18 propels it through the overhead transfer tube to the opposite terminal. When it is desirable to bring carrier 18 to terminal 500, blower assembly 100 is operated to establish a vacuum within chamber 512. The vacuum in chamber 512 communicates with the transfer tube via conduit 522. As carrier 18 enters the upper end of terminal housing 500, and passes opening 528, carrier 18 settles into the carrier receiver 510 under gravity. The terminal and gate design described in U.S. Pat. No. 5,299,891 creates a cushion of air below the incoming carrier 18 to slow the decent of carrier 18 prior to engaging a stop of carrier receiver 510. In this respect, by providing the opening 528 above the access opening of the terminal the propelling force created by the vacuum is eliminated once carrier 18 drops past opening 528, and carrier 18 is allowed to decelerate under a cushion of air before impacting on the lower end of the carrier receiver 510. Blower assembly 100 thus lends itself to use in an overhead or underground terminal assembly for conveying carriers through an overhead tube or an underground tube.

FIGS. 9 and 10 show a terminal 550 illustrating an alternate embodiment of the overhead terminal shown in FIG. 8. In the embodiment shown in FIG. 9, a valve arrangement, designated 570 in the drawings, replaces spring-biased valves 532, 534 and conduit 522 of terminal 500 in FIG. 8. A cylindrical duct 552 defines a cylindrical passage 554 which communicates with chamber 512. Duct 552 is connected to the lower side of carrier receiver 510 by a flexible tube 556. Passage 554 communicates through chamber 512 and hose 508 to tube 184 of blower assembly 100. A butterfly valve 560 is provided within passage 554 to regulate air flow therethrough. Valve 560 is movable by a rotary solenoid 562 (best seen in FIG. 10) between an open position shown in FIG. 9 and a closed position (illustrated in phantom in FIG. 9). A pair of sensors 564, preferably infrared (IR) sensors, are provided above carrier receiver 510. Sensors 564 are preferably disposed within transfer tube P at the highest point directly above carrier receiver 510. In other words, sensors 564 are preferably disposed at the upper end of the vertical section of transfer tube P connected to terminal 550. Sensors 564 are arranged to detect passage of carrier 18.

Referring now to the operation of terminal 550, when a carrier 18 is to be transferred from terminal 550, blower assembly 100 is operated to establish a pressure within cavity 512, and valve 560 is moved to an open position, as shown in FIG. 9. Pressure in cavity 512 communicates to the bottom side of the carrier 18 via passage 554. The pressure below carrier 18 propels it through the overhead transfer tube to the opposite terminal, in a manner as previously described. When it is desired to bring carrier 18 from the opposite terminal to terminal 550, blower assembly 100 is operated to establish a vacuum within chamber 512. Valve 560 remains in an open position. The vacuum in chamber 512 communicates with the transfer tube 16 via passage 554 and carrier receiver 510. When carrier 18 passes sensors 564, a signal is sent to the system controller. At this time, the system controller deactivates blower assembly 100 and causes solenoid 562 to move valve 560 to a closed position. From this point in time, carrier 18 enters the upper end of terminal housing 550 and settles into carrier receiver 510 under the influence of gravity. As indicated above, the terminal and gate design described in U.S. Pat. No. 5,299,891 creates a cushion of air below the incoming carrier 18 to slow the decent of carrier 18 prior to engaging a stop of carrier receiver 510. Carrier 18 decelerates under a cushion of air before impacting on the lower end of the carrier receiver 510.

Figure 11:
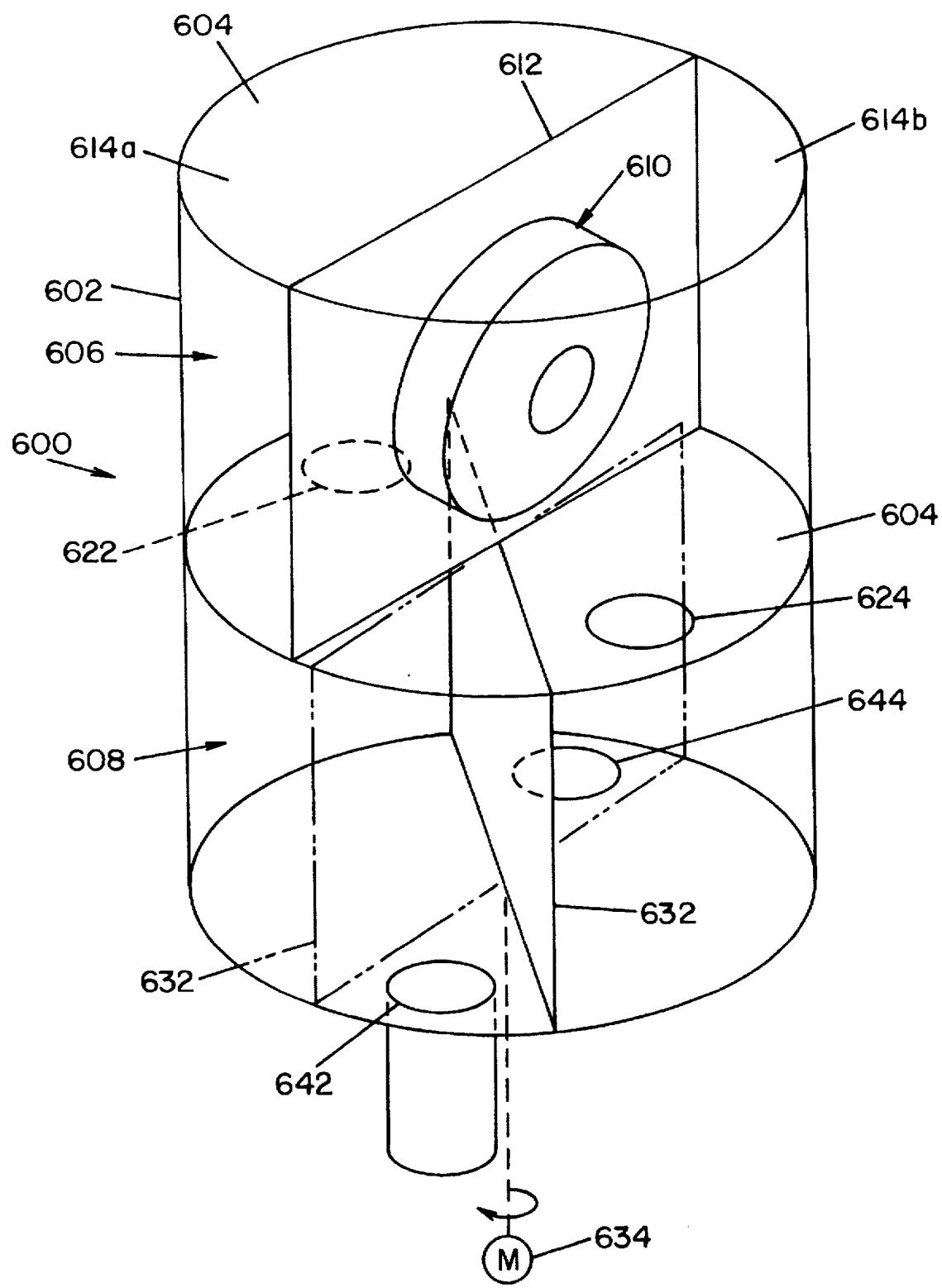
FIG. 11 is a partially sectioned, perspective view illustrating an alternate embodiment of a reversible blower assembly.

Referring now to FIG. 11, an alternate embodiment of a blower assembly is shown. Blower assembly 100 described in FIGS. 3–5 disclosed a blower 110 movable within a housing. FIG. 11 shows a blower assembly 600 having a stationary blower 610. Specifically, blower assembly 600 is comprised of a generally cylindrical housing 602 having an inner wall 604 dividing housing 602 into an upper cavity 606 and a lower cavity 608. In the upper cavity, a stationary plate 612 divides the cavity into two semicylindrical chambers 614a, 614b. Blower motor 610 is mounted to plate 612 in a manner previously described wherein the blower motor 610 is operable to establish a pressure on one side of plate 612 and a vacuum on the other side of plate 612. Apertures 622, 624 extend through inner wall 604 and communicate with lower cavity 608. Apertures 622, 624 are disposed on opposite sides of plate 612. Lower cavity 608 is likewise bisected by a plate 632 which creates two chambers within lower cavity 608. Lower plate 632 is movable within lower cavity 608 by motor 634 and is juxtaposed relative to the position of stationary plate 612. Ports 642, 644 are provided on the opposite sides of moving plate 632. Ports 642, 644 are offset relative to apertures 622, 624 such that movement of plate 632 can cause ports 642, 644 to alternately align with opposite apertures 622, 624. In other words, lower plate 632 is movable between a first position where port 642 is in communication with aperture 622 and port 644 is in communication with aperture 624 (as shown in FIG. 11), and second position where port 622 is in communication with aperture 644 and port 624 is in communication with aperture 642 (as shown by phantom plate 632 in FIG. 11). Motor 634 thus moves lower plate between the first and second position, and ports 642, 644 may alternate between being exposed to a pressure chamber or a vacuum chamber in upper cavity 606. Blower assembly 600 thus provides a reversible blower assembly similar in shape and function to that previously described in FIGS. 3–5, but wherein the blower motor 610 is stationary within housing 602.

The foregoing description is of preferred embodiments of the present invention. It should be appreciated that these embodiments are described for purposes of illustration only, and that numerous alterations arid modifications may be practiced by those skilled in the art without departing from the spirit and scope of the invention. It is intended that all such modifications and alterations be included insofar as they come within the scope of the invention as claimed or the equivalents thereof.

Having described the invention, we claim:

1. A system for pneumatically transferring articles between two spaced-apart locations comprising:
   a first terminal and a second terminal each having a carrier access opening therein;
   a transfer tube connecting said first terminal to said second terminal;
   a tubular carrier positionable within said transfer tube to be pneumatically transferred through said first and second terminals, said carrier being manually insertable into and removable from said terminals through said access openings;
   a blower assembly within one of said terminals operable to create alternately a pressure or a vacuum in said transfer tube, said blower assembly comprising a housing having a first external port, a second external port, and a first chamber and a second chamber defined within said housing, said chambers being movable within said housing between a first position wherein said first port communicates with said first chamber and said second port communicates with said second port and a second position wherein said first port communicates with said second chamber and said second port communicates with said first chamber; and
   a movable blower within said housing for producing a negative pressure in said first chamber and a positive pressure in said second chamber.

2. A system as defined in claim 1, wherein said system is an underground tube system, wherein said transfer tube projects from a lower end of said terminals.

3. A system as defined in claim 2, wherein said one of said terminals includes a latch assembly having a latch pin movable between a first latch position for supporting said carrier within said one of said terminals adjacent said carrier access opening thereof, and for preventing said carrier from being conveyed through said transfer tube, and a second latch position allowing said carrier to be conveyed through said transfer tube.

4. A system as defined in claim 3, wherein movement of said latch pin is weight sensitive, and movement of said latch pin from said first latch position to said second latch position will not occur if weight exceeding a predetermined amount exists on said latch pin.

5. A system as defined in claim 2, wherein said blower assembly further includes a planar element movable wig said housing, said element defining said first chamber and said second chamber.

6. A system as defined in claim 1, wherein said blower assembly further includes a movable plate disposed within said housing, said plate defining said chambers, and wherein said blower is mounted to said movable plate, said blower having a vacuum end on one side of said plate and a pressure end on another side of said plate.

7. A system as defined in claim 6, further including a drive motor for moving said plate within said housing.

8. A blower assembly for a pneumatic transfer tube system for alternately creating a pressure and a vacuum in a transfer tube, said blower assembly comprising:
   a housing having an inner surface defining an internal cavity within said housing and first and second ports communicating with said internal cavity;
   an element dividing said cavity into a first isolated chamber and a second isolated chamber, said element being movable within said internal cavity wherein positions of said chambers relative to said housing are movable;
   a blower movable within said housing having a vacuum end and a pressure end, said vacuum end communicating with said first isolated chamber and said pressure end communicating with said second isolated chamber; and
   a drive assembly for moving said element between a first position wherein said first isolated chamber communicates with said first port and said second isolated chamber communicates with said second port, and a second position wherein said first isolated chamber communicates with said second port and said second isolated chamber communicates with said first port.

9. A blower assembly as defined in claim 8, wherein said blower is mounted to said element.

10. A blower assembly as defined in claim 9, wherein said internal cavity is generally cylindrical in shape, said element is a generally flat rectangular plate, and said blower is mounted to said plate.

11. A blower assembly as defined in claim 10, wherein said housing and said internal cavity are generally symmetrical about a central axis extending through said housing and said plate is rotatable about said central axis.

12. A blower assembly as defined in claim 11, further comprising a drive assembly for rotating said plate about said axis.

13. A blower assembly as defined in claim 10, further comprising a seal member mounted to said plate about a periphery thereof to form a seal between said plate and said inner surface of said housing.

14. A blower assembly as defined in claim 13, wherein the inner surface of said housing includes surface means for engagement with said seal member on said plate.

15. A blower assembly for a pneumatic transfer tube system for alternately creating a pressure or a vacuum in a transfer tube, said blower assembly comprising a housing having an internal cavity and a first port and a second port, said first port and said second port each communicating with said cavity, a movable plate dividing said internal cavity into two chambers which are generally isolated from each other, a blower having a vacuum end and a pressure end mounted to said plate, wherein said vacuum end is on one side of said plate and said pressure end is on another side of said plate, said blower when operating creating a pressure chamber on said another side of said plate and a vacuum chamber on said one side of said plate, and a drive assembly attached to said plate for moving said plate between a first position wherein said pressure chamber is in communication with said first port and said vacuum chamber is in communication with said second port, and a second position wherein said pressure chamber is in communication with said second port and said vacuum chamber is in communication with said first port.

16. A blower assembly as defined in claim 15, wherein said internal cavity is generally cylindrical in shape and symmetrical about a central axis extending through said housing, and said plate is rotatable about said central axis.

17. A blower assembly as defined in claim 15, wherein said housing is comprised of first and second housing sections.

18. A blower assembly as defined in claim 7, wherein each of said housing sections includes a cylindrical wall portion and a flat planar end portion.

19. A blower assembly as defined in claim 18, wherein said first and second ports are formed in the flat planar end portion of one of said housing sections.

20. A system for pneumatically transferring articles between two spaced-apart locations comprising:

a first terminal having a first access opening communicating with a first carrier receiver therein;

a second terminal having a second access opening communicating with a second carrier receiver therein;

a transfer tube connecting said first carrier receiver in said first terminal to said second carrier receiver in said second terminal;

a noncaptive, tubular carrier positionable within said transfer tube to be pneumatically transferred through said tube between said first and second terminals, said carrier being manually insertable into and removable from said first carrier receiver through said first access opening and being manually insertable into and removable from said second carrier receiver through said second access opening;

a gate mechanism on said first terminal including a generally planar gate member movable between a first position closing said first access opening and a second position removed from said first access opening;

a gate mechanism on said second terminal including a generally planar gate member movable between a first position closing said second access opening and a second position removed from said second access opening; and a blower assembly within said first terminal, said blower assembly having a first port and a second port, said first port communicating with one side of said first carrier receiver of said first terminal and said second port communicating with another side of said first carrier receiver of said first terminal, said blower assembly having a first operating condition wherein a pressure is created at said first port and a vacuum is created at said second port, and a second operating condition wherein a vacuum is created at said first port and a pressure is created at said second port, said blower assembly comprising a housing having an internal cavity communicating with said first port and said second port, a movable plate dividing said internal cavity into two chambers which are generally isolated from each other, a blower having a vacuum end and a pressure end mounted to said plate, wherein said vacuum end is on one side of said plate and said pressure end is on another side of said plate, said blower when operating creating a pressure chamber on said other side of said plate and a vacuum chamber on said one side of said plate, and a drive assembly attached to said plate for moving said plate to a first position during said first operating condition wherein said pressure chamber is in communication with said first port and said vacuum chamber is in communication with said second port, and to a second position during said second operating condition wherein said pressure chamber is in communication with said second port and said vacuum chamber is in communication with said first port.

21. A system as defined in claim 20, wherein said internal cavity is generally cylindrical in shape and symmetrical about a central axis extending through said housing, and said plate is rotatable about said central axis.

22. A system for pneumatically transferring articles between two spaced-apart locations comprising:

a first terminal having an elongated, cylindrical body with a carrier access opening therein;

a transfer tube connecting an end of said cylindrical body of said first terminal to a second terminal;

a noncaptive, tubular carrier positionable within said transfer tube to be pneumatically transferred through said tube between said first and second terminals;

a gate member on said first terminal movable between a first position closing said access opening and a second position removed from said access opening; and a generally cylindrical blower assembly within said first terminal operable to create alternately a pressure or a vacuum in said transfer tube, said blower assembly comprising a housing having a cylindrical internal cavity and a first external port and a second external port communicating with said cavity, a separating member within said cavity dividing said cavity into a first isolated chamber and a second isolated chamber, a blower mounted to said separating member having a vacuum end and a pressure end for creating a pressure in said first isolated chamber and a vacuum in said second isolated chamber, and a drive assembly for rotating said separating member and said blower about an axis between a first position wherein said first isolated chamber is in communication with said first port and said second isolated chamber is in communication with said second port, and a second position wherein said first isolated chamber is in communication with said second port and said second isolated chamber is in communication with said first port.

23. A system as defined in claim, 22, wherein said first terminal is oriented along a generally vertical axis.

24. A system as defined in claim 23, wherein said transfer tube connected to said first terminal extends from an upper end of said terminal.

25. A system as defined in claim 23, wherein said transfer tube connected to said first terminal extends from a lower end of said terminal.

26. A system as defined in claim 25, wherein said first terminal includes a weight sensitive arrangement for limiting the transferring of said carrier when overweighted.

* * * * *